United States Patent
Song

(10) Patent No.: US 7,515,216 B2
(45) Date of Patent: Apr. 7, 2009

(54) LIQUID CRYSTAL DISPLAY AND FABRICATION METHOD THEREOF

(75) Inventor: In Duk Song, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 502 days.

(21) Appl. No.: 11/265,016

(22) Filed: Nov. 2, 2005

(65) Prior Publication Data

US 2006/0050190 A1 Mar. 9, 2006

Related U.S. Application Data

(62) Division of application No. 10/624,329, filed on Jul. 21, 2003, now Pat. No. 6,980,262.

(30) Foreign Application Priority Data

Dec. 31, 2002 (KR) .................. 10-2002-0088519

(51) Int. Cl.
*G02F 1/1343* (2006.01)
*G02F 1/136* (2006.01)

(52) U.S. Cl. .............. 349/39; 349/38; 349/43
(58) Field of Classification Search ........... 349/38–43, 349/187

See application file for complete search history.

(56) References Cited

U.S. PATENT DOCUMENTS

| | | | | |
|---|---|---|---|---|
| 5,917,211 A | * | 6/1999 | Murata et al. | 257/296 |
| 6,310,669 B1 | * | 10/2001 | Kobayashi et al. | 349/43 |
| 6,614,496 B1 | | 9/2003 | Song et al. | |
| 6,682,658 B2 | * | 1/2004 | Ahn et al. | 216/6 |
| 6,757,031 B2 | * | 6/2004 | Lin et al. | 349/43 |
| 2004/0075094 A1 | | 4/2004 | Yamasaki et al. | |

* cited by examiner

*Primary Examiner*—Dung T. Nguyen
(74) *Attorney, Agent, or Firm*—Brinks Hofer Gilson & Lione

(57) ABSTRACT

A liquid crystal display has a storage capacitor of storage on common type in a pixel region with a passivation film of an inorganic insulating layer and an organic layer stacked on the inorganic insulating layer. The liquid crystal display includes: a storage capacitor lower electrode formed in the pixel region; a gate insulating layer formed on the storage capacitor lower electrode; the passivation film formed on the gate insulating layer, and a pixel electrode formed on the inorganic insulating layer. In the storage capacitance region of the pixel region, the organic insulating layer is partially or wholly removed and the pixel electrode functions as a storage capacitor upper electrode.

4 Claims, 5 Drawing Sheets

LIQUID CRYSTAL DISPLAY AND FABRICATION METHOD THEREOF

This application is a divisional application of U.S. application Ser. No. 10/624,329 filed on Jul. 21, 2003, now U.S. Pat. No. 6,980,262 entitled "LIQUID CRYSTAL DISPLAY AND FABRICATION METHOD THEREOF".

BACKGROUND OF THE INVENTION

1. Field of the Invention

The present invention relates to a liquid crystal display (LCD) and fabrication method thereof, and more particularly, to a liquid crystal display and fabrication method thereof in which both layers of organic insulating layer and inorganic insulating layer are used as a passivation film to allow a storage capacitor to have a large storage capacitance, thereby improving the display quality of displayed images.

2. Description of the Related Art

As information technology has advanced and society has become more and more dependent on display of information from various sources. Thus, there is a constant need for a flat panel display with superior characteristics such as slimness, lightweight and low power consumption. Among the various flat panel displays in existence, liquid crystal displays (LCDs) are superior in resolution, color display, display quality and the like. It is thus no wonder that LCDs are actively being employed in notebook computers and desktop computers.

In general, an LCD is formed using two substrates each having an electrode formed on an inner surface thereof. The substrates are arranged to face with each other, and liquid crystal material is injected into a space between the two substrates. In such LCDs, images are displayed by applying voltages to the substrates to generate an electric field, move the liquid crystal molecules of the liquid crystal layer selectively and thus change transmittance of light.

On an inner surface of the lower substrate of the LCD, a plurality of thin film transistors are arranged in a matrix configuration. On an inner surface of the upper substrate of the LCD, a common electrode is formed.

Pixel electrodes of the lower substrate and the common electrode of the upper substrate constitute liquid crystal capacitors. In each of the liquid crystal capacitors, a voltage applied to the liquid crystal capacitor is not held until the next signal is inputted but leaks away and disappears. To this end, the storage capacitor is formed to stabilize gray scale display and decrease flicker and residual image as well as to maintain the applied voltage.

The storage capacitor can be formed by two methods. In one method, a separate storage capacitor electrode is formed and is connected with the common electrode. In another method, a portion of the (n-1)-th gate line is used as the storage capacitor electrode of the n-th pixel.

The former type of storage capacitor is generally called 'storage on common' type or 'independent storage capacitor' type while the latter type of storage capacitor is generally called 'storage on gate' type or 'previous gate' type.

Hence, an LCD employing a storage capacitor formed by the storage on common type will be described below with reference to FIGS. 1 and 2. FIG. 1 is a plan view schematically showing one pixel in an LCD employing a storage capacitor formed by the conventional storage on common type and FIG. 2 is a sectional view taken along the line I-I' of FIG. 1.

As shown in FIG. 1, on a lower substrate of an LCD, a gate line 11 and a data line 12 are formed to cross with each other. At a cross point of the gate line 11 and the data line 12, a thin film transistor 14 including gate electrode, source electrode and drain electrode are formed. At a cross point of the gate line 11 and the data line 12, a thin film transistor 14 each including gate electrode, source electrode and drain electrode are formed. At a pixel region defined by the pair of gate lines 11 and the pair of data lines 12 that cross with each other, a pixel electrode 15 contacting with the drain electrode is formed.

At a center portion of the pixel region, a storage capacitor lower electrode 13 is provided in a direction parallel with the gate line 11. The storage capacitor lower electrode 13 and the pixel electrode 15 form a storage capacitor. In other words, the pixel electrode 15 serves as an upper electrode of the storage capacitor.

Hereinbelow, structure of a storage capacitor formed on lower substrate of an LCD will be described with reference to FIG. 2.

In other words, as shown in FIG. 2, the storage capacitor lower electrode 13 formed on the substrate 21 and the pixel electrode formed above the storage capacitor lower electrode 13 form a storage capacitor. Here, the storage capacitor lower electrode 13 is formed of the same material as the gate electrode during the process of forming the gate electrode.

On the storage capacitor lower electrode 13, a gate insulating layer 23 and a passivation film 25 are sequentially formed. On the passivation film 25, the pixel electrode 15 is formed. The passivation film is inorganic insulator.

Detailed fabrication method of the aforementioned LCD will be omitted since it is widely known to those skilled to the art.

In the storage capacitance type LCD having the aforementioned structure, the storage capacitor is formed at pixel region and uses a separate storage electrode line as shown in FIGS. 1 and 2.

Either a common voltage applied to the lower substrate of the LCD or a separate storage voltage can be used as the storage voltage supplied to the storage electrode line. As the voltage drop ($\Delta Vp$) in an LC capacitor decreases as the storage capacitance of the storage capacitor increases, it becomes possible to display an image having a better picture quality with a larger storage capacitance.

Hence, one object in fabricating LCDs is to increase the capacitance of the storage capacitor as much as possible. However, other factors may balance the need for increasing the capacitance of the storage capacitor. For example, an LCD having a ferroelectric liquid crystal needs a large capacitance or a high resolution LCD having a high pixel density has a high area ratio of the storage capacitor to the pixel area, which decreases the aperture ratio of the pixel.

As one method to overcome this drawback, an organic insulator is used as the passivation film to increase the aperture ratio of the pixel. Unfortunately, the use organic insulator in and of itself is not enough at least because of the lower dielectric constant, thereby severely impacting the quality of displayed image. In an LCD in which the organic insulating layer is used as the passivation film, an inorganic insulating layer is also used along with the organic insulating layer, so that the passivation film is relatively thick. However, since the organic insulating layer has a dielectric constant lower than that of the inorganic insulating layer, the storage capacitance of the organic insulating layer is smaller than that of a comparably sized inorganic insulating layer.

Thus, since the storage capacitance of the LCD having a passivation film containing both an organic insulating layer and an inorganic insulating layer is smaller than that having only an inorganic insulating layer of the same size as the combination, the quality of displayed image is decreased relative to an LCD in which the passivation film contains only the inorganic insulating layer. Such a decrease, while less than that of an LCD in which the passivation film contains only the organic layer, remains unacceptable because of the need to increase the display quality while shrinking the display size.

SUMMARY OF THE INVENTION

Accordingly, the present invention is directed to a liquid crystal display and fabrication method thereof that substantially obviates one or more problems due to limitations and disadvantages of the related art.

An object of the present invention is to provide a liquid crystal display and fabrication method thereof in which both an organic insulating layer and inorganic insulating layer are used as the passivation film but in which the capacitance of the storage capacitor remains relatively large, thereby improving the display quality of displayed images.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display is provided that comprises a storage capacitor of storage on common type formed in a storage capacitor region of a pixel region; a storage capacitor lower electrode formed at the storage capacitor region; a gate insulating layer formed on the storage capacitor lower electrode; a passivation film containing an inorganic insulating layer and an organic insulating layer stacked on the inorganic insulating layer in the pixel region but devoid of the inorganic insulating layer in the storage capacitor region, the passivation film formed on the gate insulating layer; and a pixel electrode formed on the passivation layer and functioning as a storage capacitor upper electrode in the storage capacitor region.

In an aspect of the present invention, a liquid crystal display is provided that comprises a storage capacitor of storage on common type formed in a storage capacitor region of a pixel region; a storage capacitor lower electrode formed at the storage capacitor region; a gate insulating layer formed on the storage capacitor lower electrode; a passivation film containing an inorganic insulating layer and an organic insulating layer stacked on the inorganic insulating layer in the pixel region, the organic insulating layer being thinner in the storage capacitor region than in the remainder of the pixel region, the passivation film formed on the gate insulating layer; and a pixel electrode formed on the passivation layer and functioning as a storage capacitor upper electrode in the storage capacitor region.

In another aspect of the present invention, a method of fabricating a liquid crystal display is provided that comprises: depositing a metal film on a substrate and patterning the deposited metal film to form a gate electrode in a transistor region and a storage capacitor lower electrode in a pixel region; depositing a gate insulating layer; sequentially depositing an intrinsic semiconductor layer and an impurity-doped semiconductor layer on the gate insulating layer and patterning the deposited intrinsic semiconductor layer and impurity-doped semiconductor layer to form an active layer and an ohmic contact layer in the transistor region; depositing a metal layer and patterning the deposited metal film to form a source electrode and a drain electrode in the transistor region; sequentially depositing an inorganic insulating layer and an organic insulating layer to form a passivation film; performing a full exposure to define a contact hole over the drain region of the transistor region and a diffraction exposure over the storage capacitor lower electrode of the pixel region; developing and etching to form the contact hole exposing the drain electrode in the transistor region, and etching the passivation film on the storage capacitor lower electrode of the pixel region such that the passivation film has a predetermined thickness; and depositing a transparent metal film and patterning the deposited transparent metal film to form a pixel electrode functioning as a storage capacitor upper electrode.

In another aspect of the present invention, a liquid crystal display is provided that comprises a storage capacitor formed in a storage capacitor region and a passivation film. The passivation film contains at least an inorganic insulating layer in the storage capacitor region and at least the inorganic insulating layer and an organic insulating layer in a region outside the storage capacitor region. The passivation film is thinner in the storage capacitor region than in the region outside the storage capacitor region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, there will be concrete embodiments for clearly describing the spirit and scope of the present invention.

Figure 1:
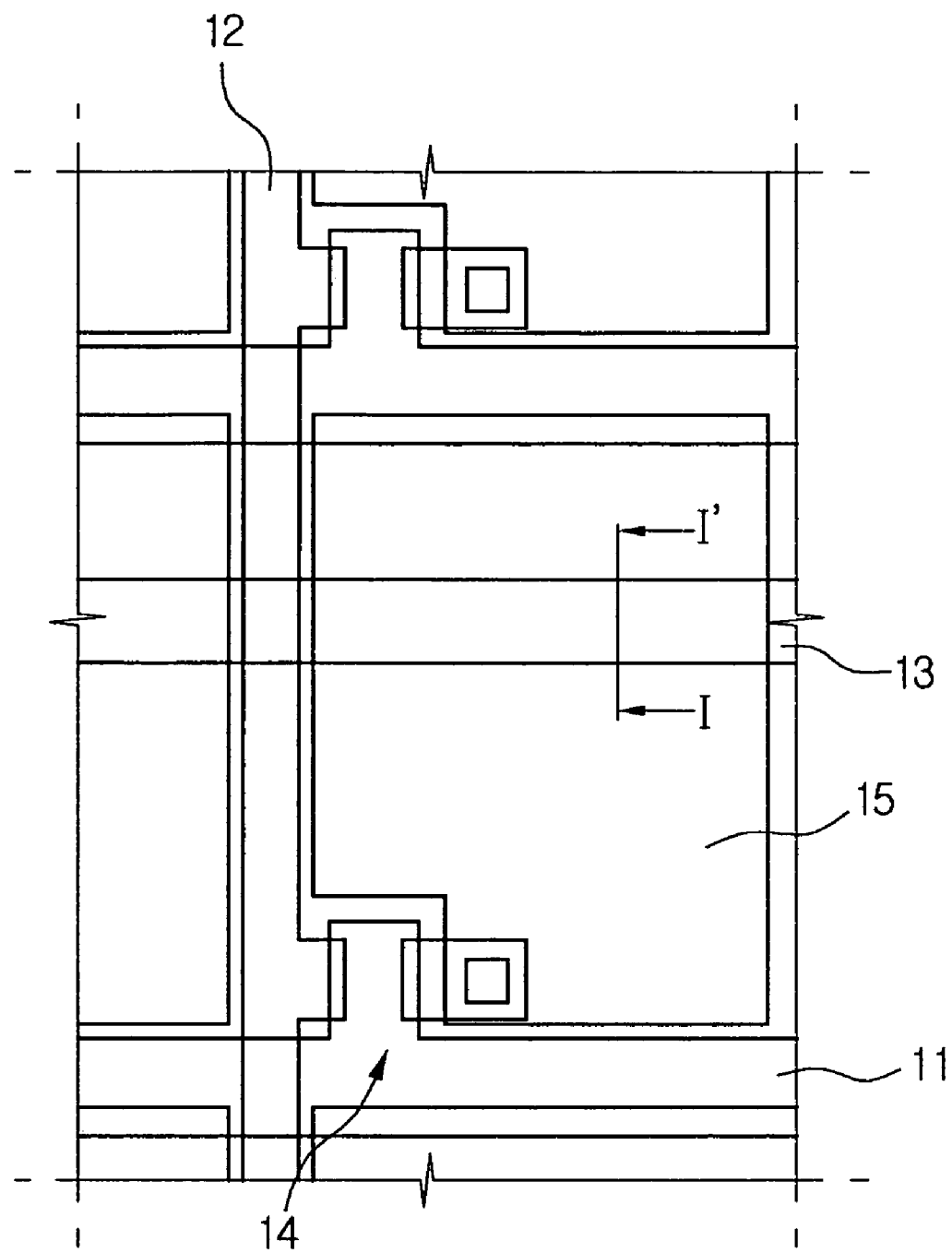
FIG. 1 is a plan view schematically showing one pixel in an LCD employing a storage capacitor formed by the conventional storage on common type.
Figure 2:
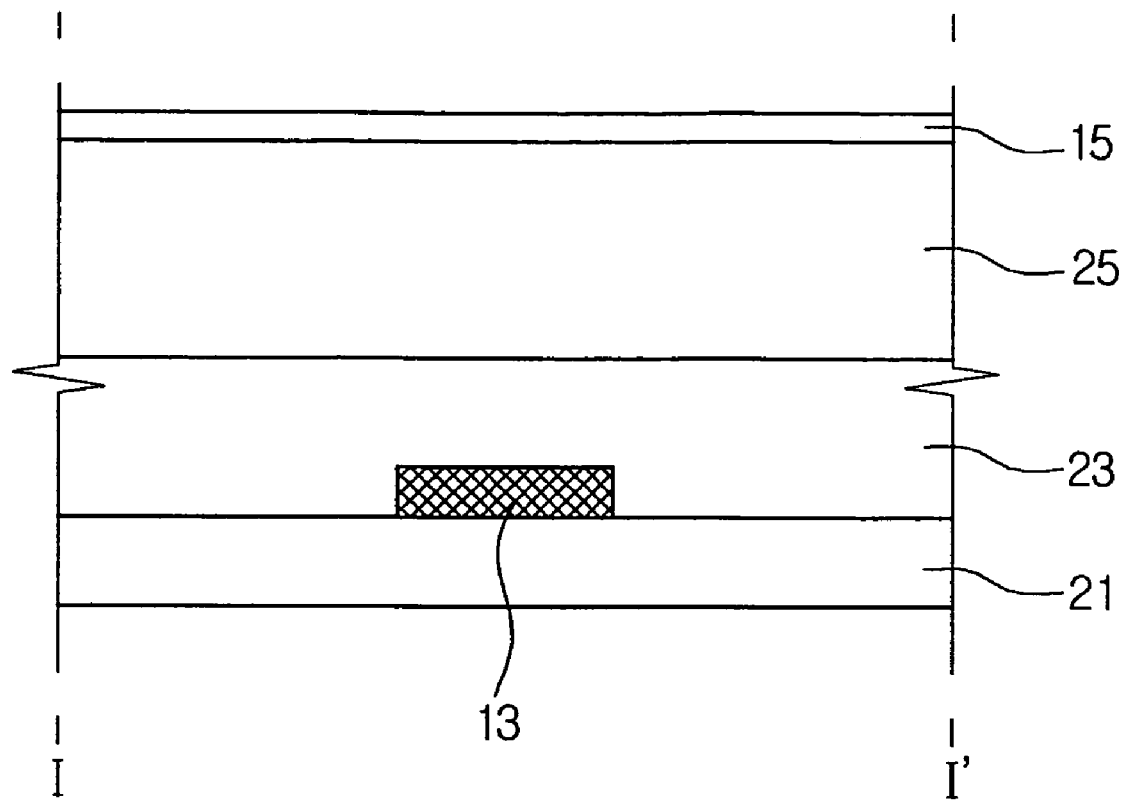
FIG. 2 is a sectional view taken along the line I-I' of FIG. 1.
Figure 3:
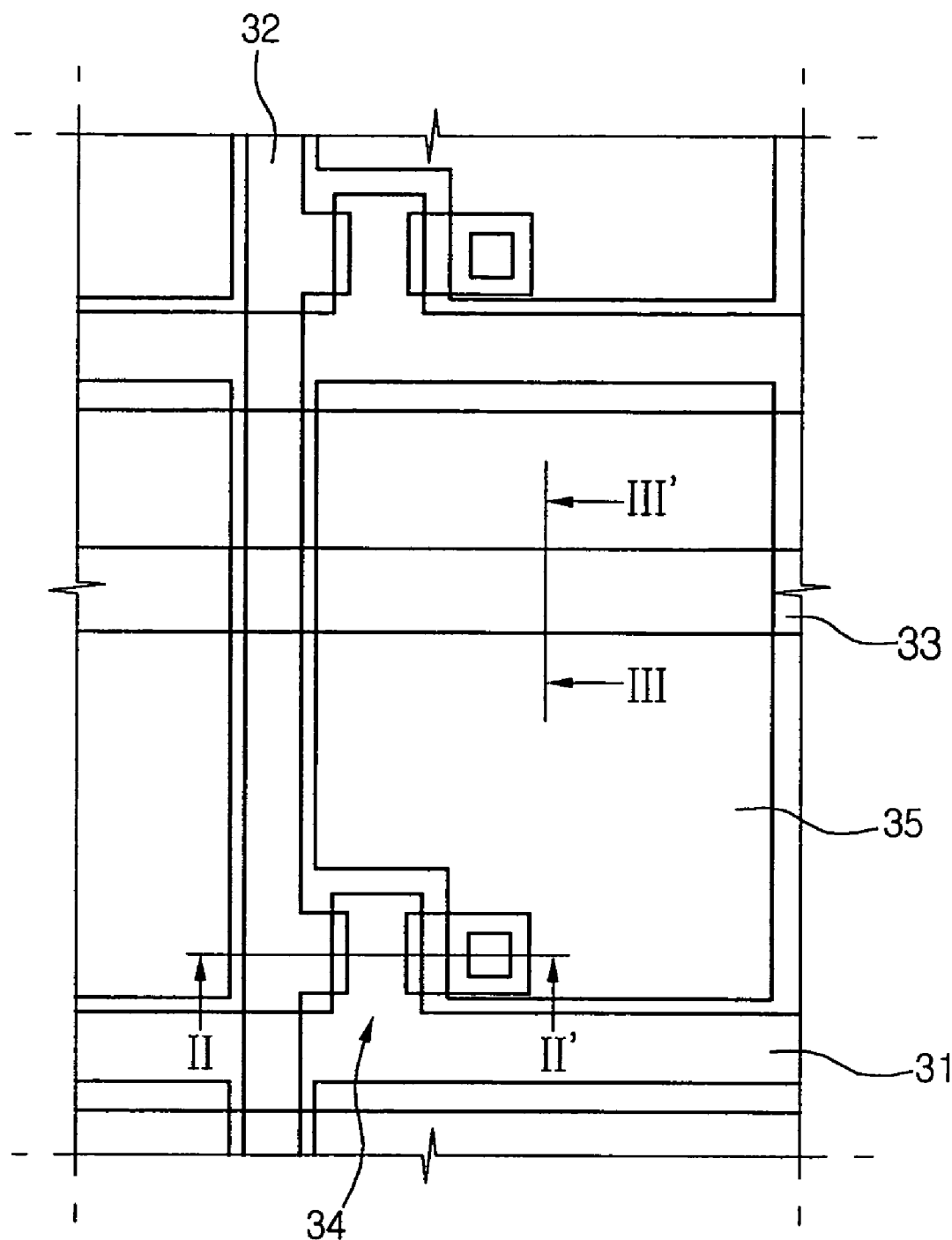
FIG. 3 is a plan view schematically showing one pixel in an LCD employing a storage capacitor formed by a storage on common type according to the present invention.

FIG. 3 is a plan view schematically showing one pixel in an LCD employing a storage capacitor formed by a storage on common type according to the present invention.

As shown in FIG. 3, on a lower substrate of an LCD according to the present invention, a gate line 31 and a data line 32 are formed to cross with each other. At a cross point of the gate line 31 and the data line 32, a thin film transistor 34 including gate electrode, source electrode and drain electrode is formed. In a pixel region defined by the pair of gate lines 31 and the pair of data lines 32 that cross with each other, a pixel electrode 35 contacting with the drain electrode is formed.

At a center portion of the pixel region, a storage capacitor lower electrode 33 is provided in a direction parallel with the gate line 31. A storage capacitor is formed by the storage capacitor lower electrode 33 and the pixel electrode 35, the pixel electrode 35 serving as an upper electrode of the storage capacitor.

A composite film consisting of an inorganic insulating layer and organic insulating layer formed in a stack structure is employed as a passivation film. In order to review characteristics of the LCD according to the present invention, a fabrication method of the LCD will be described with reference to the sectional views of FIGS. 4A to 4E taken along the lines II-II' and II-III' of FIG. 3. FIGS. 4A to 4E are sectional views illustrating a fabrication process of an LCD employing a storage capacitor formed by a storage on common type according to the present invention.

Herein, the line II-II' of FIG. 3 is to illustrate a section of a thin film transistor region where a thin film transistor is formed while the line III-III' is to illustrate a storage capacitor region, i.e. a section of the pixel region where the storage capacitor is formed.

Figure 4A:
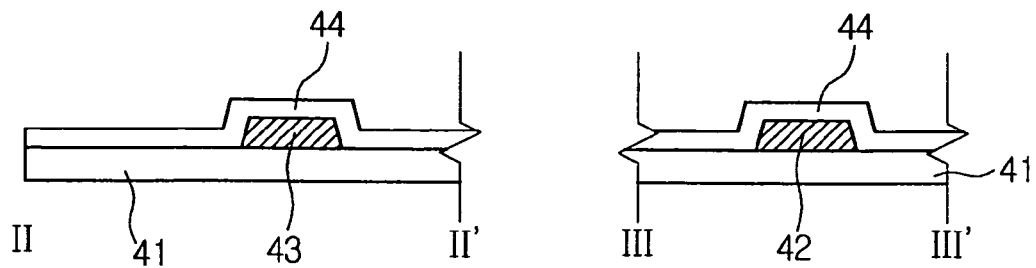
FIGS. 4A to 4E are sectional views illustrating a fabrication process of an LCD employing a storage capacitor formed by a storage on common type according to the present invention.

First, referring to FIG. 4A, a thin metal film of aluminum (Al), copper (Cu) or the like is deposited on a substrate 41 by a sputtering and then patterned by a photolithographic process to form a gate electrode 43 and a storage capacitor lower electrode 42 on the substrate 41.

Next, a gate insulating film 44 is deposited on the surface of the resultant substrate 41 so as to cover the gate electrode 43 and the storage capacitor lower electrode 42. The gate insulating film 44 is formed of insulator such as silicon nitride ($SiN_x$), silicon dioxide ($SiO_2$) or the like.

Figure 4B:
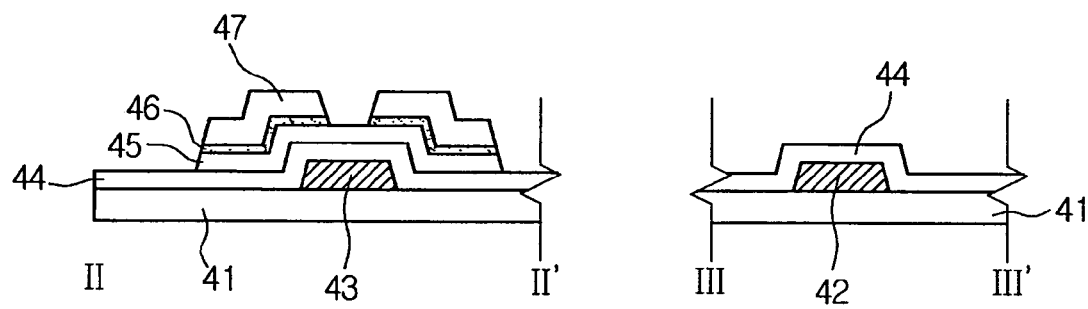

Next, subsequent processes will be described with reference to FIG. 4B.

On the gate insulating film 44, an intrinsic (i.e., non-doped) semiconductor layer and an impurity-doped semiconductor layer are sequentially formed. The intrinsic semiconductor layer and the impurity-doped semiconductor layer are generally formed by a chemical vapor deposition (CVD).

The intrinsic semiconductor layer is formed of amorphous silicon or polycrystalline silicon that is not doped with impurities. The impurity doped semiconductor layer is formed of amorphous silicon or polycrystalline silicon that is highly doped with N- or P-type impurities.

The intrinsic semiconductor layer and the impurity-doped semiconductor layer are patterned by a photolithographic process that includes an anisotropic etch such that an ohmic contact layer 46 and an active layer 45 are formed only at a corresponding portion to the gate electrode 43. The photolithographic process is performed such that the gate insulating film 44 is exposed. At this time, the active layer 45 and the ohmic contact layer 46 located at a portion corresponding to the storage capacitor lower electrode 42 are removed.

Afterwards, a metal film is deposited on the resultant substrate on which the active layer 45 and the ohmic contact layer 46 are formed, and is then patterned by a photolithographic process to form a source/drain electrode 47.

Figure 4C:
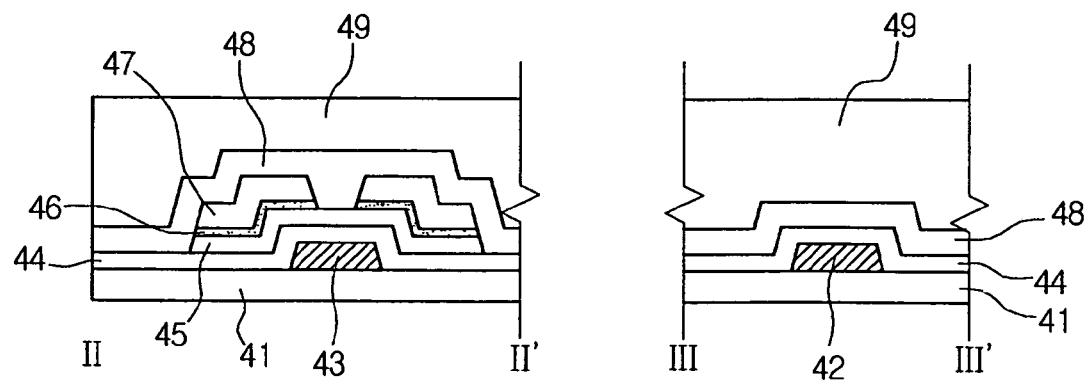

Thereafter, as shown in FIG. 4C, a passivation film consisting of an inorganic layer 48 and an organic layer 49 is formed. In forming the passivation film, the inorganic insulating layer 48 is first formed and then the organic insulating layer 49 is stacked on the inorganic insulating layer 48. As a result, the passivation film has a stack structure in which the organic insulating layer 49 is stacked on the inorganic insulating layer 48.

The organic insulating layer may be formed from a material having a low dielectric constant such as an acryl-based organic compound, Teflon, BCB (Benzocyclobutene), FPAE (Fluoropolyarrylether), cytop and PFCB (Perfluorocyclobutane).

The organic insulating layer 49 is a photo-reactive insulating material that has multiple functions. In addition to being able to be used as an insulator or passivation layer, it also functions as a photoresist film. Thus, the organic insulating layer 49 is patterned by an exposure and development process using a photomask without requiring a separate photoresist film to form a desired pattern. Unlike typical photolithographic processes, however, after masking the organic insulating layer 49 is not removed but is cured to form the passivation film.

After the passivation film of the organic insulating layer 49 and the inorganic insulating layer 48 is formed, a contact hole is formed. The contact hole connects the drain electrode 47 with the pixel electrode 35.

Figure 4D:
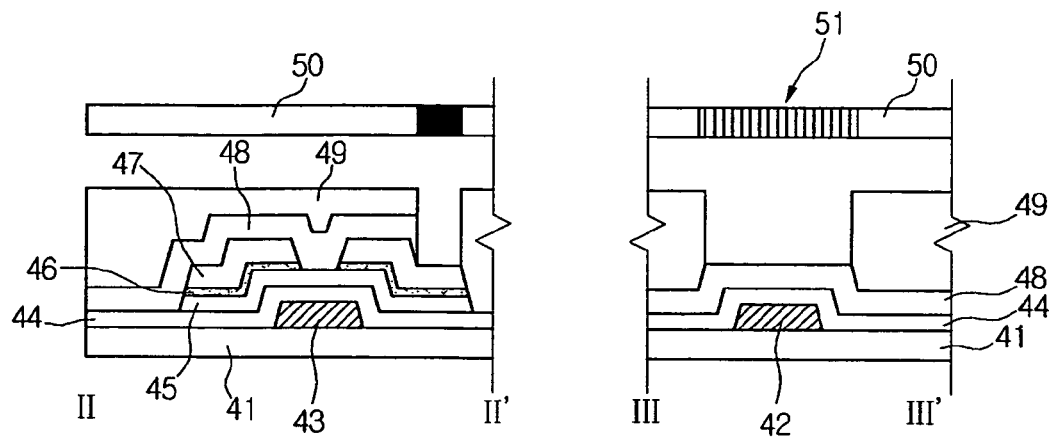

In forming the contact hole, a diffraction exposure technique is carried out with respect to the region where the storage capacitor is being formed. In other words, as shown in FIG. 4D, a mask 50 having a diffraction pattern 51 is used when exposing the organic insulating layer 49.

After exposing the organic insulating layer 49, a contact hole region is formed in which the inorganic insulating layer 48 and the organic insulating layer 49 are completely removed, and a storage capacitor region is formed in which essentially only the organic insulating layer 49 is removed. In the storage capacitor region, the organic insulating layer 49 and perhaps some of the inorganic insulating layer 48 is removed such that the passivation layer in this region has a predetermined thickness. As shown, FIG. 4D corresponds to an example in which all of the organic insulating layer 49 has been removed so that only the inorganic insulating layer 48 exists in the storage capacitor region. However, as above, by controlling levels of the diffraction exposure and the amount of etching, how much the organic insulating layer being left can be selected. Also, it is possible to control the thickness of the inorganic insulating layer 48.

Figure 4E:
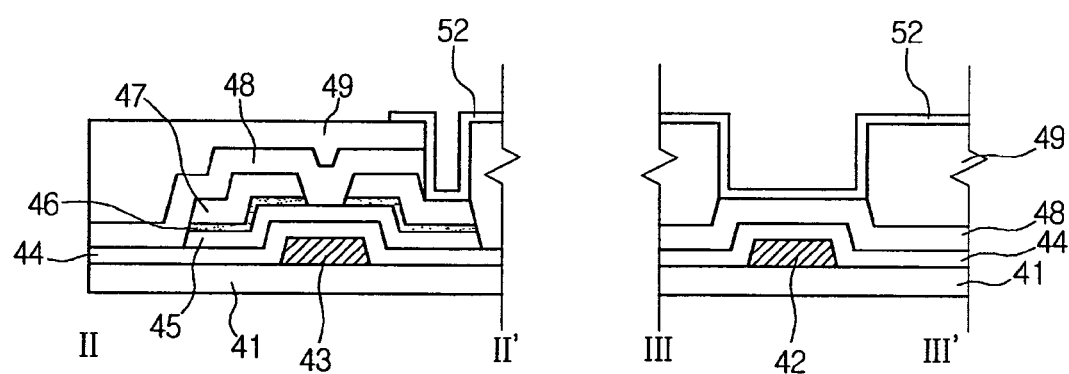

Next, as shown in FIG. 4E, a pixel electrode 52 is formed on the organic insulating layer 49. The pixel electrode 52 is formed by depositing a transparent conductive material of indium-tin-oxide (ITO), indium-zinc-oxide (IZO) or indium tin zinc oxide (ITZO).

As the pixel electrode 52 is formed over the lower electrode of the storage capacitor, it serves as an upper electrode of the storage capacitor.

The pixel electrode 52 is formed on the inorganic insulating layer 48 such that the pixel electrode 52 in the storage capacitor region of the pixel region is formed in a substantially 'U' shape as viewed from a cross-sectional viewpoint of the LCD (and shown in FIG. 4E). As is illustrated, the lower portion of the 'U' shape is substantially flat, which increases the capacitance as discussed below. The pixel electrode 52 is wider and thus has a larger area than the lower electrode 42 of the storage capacitor.

The storage capacitance of the storage capacitor can be expressed by the following equation:

Equation $$C = \epsilon(A/d),$$

where C is the storage capacitance, $\epsilon$ is the dielectric constant of insulator, A is the area of the electrode and d is the distance between electrodes.

As can be seen by the above equation, it is possible to increase the storage capacitance (C) of the storage capacitor by decreasing the value of the denominator. To this end, the above embodiment increases the storage capacitance by decreasing the thickness (d) of the passivation film, i.e., the organic insulating layer 49 and the inorganic insulating layer 48, constituting the storage capacitor.

By removing the organic insulating layer 49, which has a low dielectric constant than the inorganic insulating layer 48, and moreover decreasing the thickness between the storage capacitor lower electrode and the storage capacitor upper electrode, the storage capacitance of the storage capacitor is increased.

In expatiation, the embodiment etches the organic insulating layer 49/the inorganic insulating layer 48 to decrease the thickness of the organic insulating layer 49/the inorganic insulating layer 48 and thus increase the storage capacitance of the storage capacitor. In addition, the organic insulating layer having a low dielectric constant compared with the inorganic insulating layer is removed and the etch degree of the inorganic insulating layer 48 is controlled to obtain a desired storage capacitance of the storage capacitor.

Also, in controlling the thickness of the passivation film containing the organic insulating layer 49 and the inorganic insulating layer 48, a diffraction exposure is used during formation of the contact hole so that formation can be carried out without a separate masking having to take place.

Although the pixel electrode 52 may be formed with the same width as the lower electrode 42, as above the pixel electrode 52 is wider and thus has a larger area than the lower electrode 42 of the storage capacitor. This increases the capacitance over embodiments in which the electrodes are the same width without altering the aperture ratio. In embodiment in which the width is larger, the electrical lines from the non-transparent lower electrode 42 are substantially perpendicular when they reach the transparent pixel electrode 52. In addition, it is less likely for misalignment to exist between the electrodes if some offset exists due to processing error, for example, thereby permitting the capacitance to remain large.

While the embodiment of the present invention shows and describes a storage capacitor of a storage on common type, it can be also applied to embodiments that use a storage capacitor of a storage on gate type.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a liquid crystal display, the method comprising:
   depositing a metal film on a substrate and patterning the deposited metal film to form a gate electrode in a transistor region and a storage capacitor lower electrode in a pixel region;
   depositing a gate insulating layer;
   sequentially depositing an intrinsic semiconductor layer and an impurity-doped semiconductor layer on the gate insulating layer and patterning the deposited intrinsic semiconductor layer and impurity-doped semiconductor layer to form an active layer and an ohmic contact layer in the transistor region;
   depositing a metal layer and patterning the deposited metal film to form a source electrode and a drain electrode in the transistor region;
   sequentially depositing an inorganic insulating layer and an organic insulating layer to form a passivation film;
   performing a full exposure to define a contact hole over a drain region of the transistor region and a diffraction exposure over the storage capacitor lower electrode of the pixel region by using a mask having a diffraction pattern;
   developing and etching to form the contact hole exposing the drain electrode in the transistor region, and etching the passivation film on the storage capacitor lower electrode of the pixel region such that the passivation film has a predetermined thickness; and
   depositing a transparent metal film and patterning the deposited transparent metal film to form a pixel electrode functioning as a storage capacitor upper electrode,
   wherein the etching the passivation film on the storage capacitor lower electrode of the pixel region comprises removing a portion of the organic insulating layer to form a passivation film that is thinner than the passivation film as deposited.

2. The method according to claim 1, further comprising selecting the organic insulating layer to be a photo-reactive organic insulating layer.

3. The method according to claim 1, further comprising forming the pixel electrode on the inorganic insulating layer in a substantially 'U' letter when viewed from a cross-sectional viewpoint of the liquid crystal display.

4. The fabrication method according to claim 1, further comprising forming the storage capacitor upper electrode wider than the storage capacitor lower electrode.

* * * * *